US006606814B1

(12) United States Patent
Weaver

(10) Patent No.: US 6,606,814 B1
(45) Date of Patent: Aug. 19, 2003

(54) CASE FOR FISHING POLE AND LURES

(76) Inventor: Mark Weaver, 3640 Becker Joerling, Foristell, MO (US) 63348

( * ) Notice: Subject to any disclaimer, the term of this patent is extended or adjusted under 35 U.S.C. 154(b) by 0 days.

(21) Appl. No.: 09/550,320

(22) Filed: Apr. 14, 2000

(51) Int. Cl.[7] ............................................. A01K 97/06
(52) U.S. Cl. ....................................................... 43/25.2
(58) Field of Search ........................... 43/25.2; D22/139

(56) References Cited

U.S. PATENT DOCUMENTS

| | | | | |
|---|---|---|---|---|
| 2,767,502 A | * | 10/1956 | Reynolds | 43/25.2 |
| D217,663 S | * | 5/1970 | Chamberlain | 43/25.2 |
| 4,216,604 A | * | 8/1980 | Starke | 43/25.2 |
| 4,418,490 A | * | 12/1983 | Ancona | 43/25.2 |
| 4,441,274 A | * | 4/1984 | Masur | 43/25.2 |
| 4,920,683 A | * | 5/1990 | Weber | 43/25.2 |
| 4,944,111 A | * | 7/1990 | Daniel | 43/25.2 |
| 5,502,916 A | * | 4/1996 | Krewson | 43/25.2 |
| 5,515,640 A | * | 5/1996 | Cosby | 43/25.2 |
| 5,588,245 A | * | 12/1996 | Vance | 43/25.2 |
| 6,023,876 A | * | 2/2000 | Haddad | 43/25.2 |
| 6,085,455 A | * | 7/2000 | Bracken | 43/25.2 |

* cited by examiner

*Primary Examiner*—Kurt Rowan
(74) *Attorney, Agent, or Firm*—Thompson Coburn, LLP

(57) ABSTRACT

An improved case for fishing poles and lures comprises a concave body portion having a bottom and one or more side walls. A lid or cover preferably is pivotally mounted on one side wall by means of a hinge. A pair of slots for receiving the fishing pole are formed in the body portion and in the lid to receive most presently used fishing poles. Projections to hold the fishing pole in place are provided on the body portion and the lid. Preferably the projections extend upwardly from the body portion and downwardly from the lid, and longitudinally inwardly to engage the pole and hold it in place. A second pair of fishing line slots laterally spaced from the fishing pole slots are defined by formed openings in the body portion and in the lid which are vertically aligned.

1 Claim, 6 Drawing Sheets

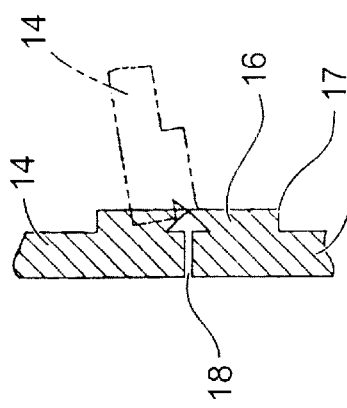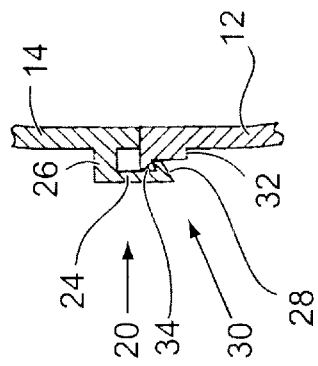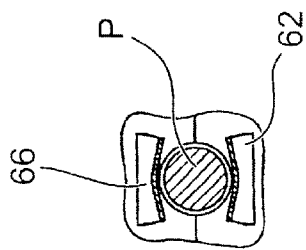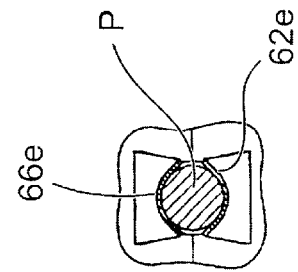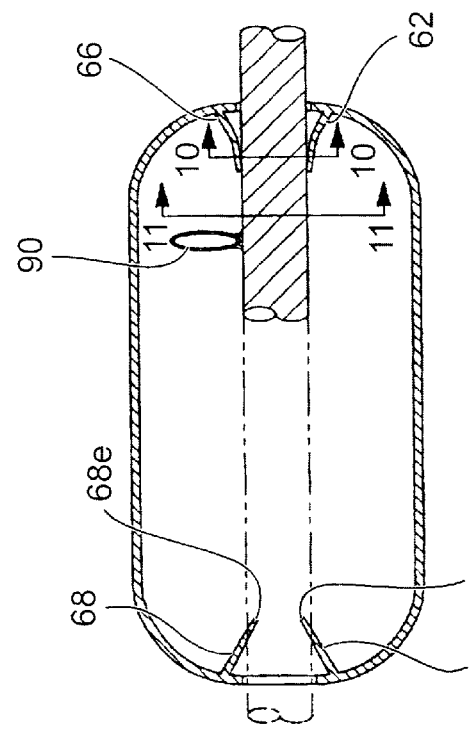

CASE FOR FISHING POLE AND LURES

I FIELD OF THE INVENTION

This invention relates to cases for fishing poles and fishing lures.

II BACKGROUND OF THE INVENTION

U.S. Pat. No. 2,167,502 discloses a transparent case for fishing lures and fishing poles in which a case top (1) is pivotally mounted to a case body (3) by means of a hinge (17). The case includes a pair of slots (7) and (9). The slots (7) provide for location of the pole and the slots (9) provide for the line L to extend out of the case. A latch member (31) holds the pole in place in one position and is movable to a vertical position to allow removal of the pole. In a closed position, a latch (23) on the top engages a catch (21) on the body to hold the pole and the lure in place.

III SUMMARY OF THE INVENTION

One object of the present invention is to provide a case where the fishing pole lines and hooks are prevented from being entangled with other lines and hooks when the pole is not in use and is placed within the case.

Another object of the present invention is to provide a case which is simpler and easier to manufacture than the case described in U.S. Pat. No. 2,767,502.

Another object is to provide a case wherein a variety of different pole sizes may be utilized without changing the size of the latch element.

Another object of the present invention is to provide a case which may be constructed of a single piece of formed plastic.

Other objects will be apparent from the following Description and Drawings.

In accordance with the present invention, an improved case 10 for fishing poles and lures is provided made of strong and resilient plastic material, preferably transparent comprising a concave body portion 12 having a bottom 13 and one or more side walls 15. A lid or cover 14 preferably made of the same plastic material as the body portion is pivotally mounted on one side wall 15w by means of a hinge 16. The hinge is preferably made of the same plastic material as the body portion and the lid and is integral with the body portion and the lid. The hinge preferably has a greater cross section 17 than the body portion and the lid, and includes a slot 18 extending part way through the hinge which divides the body portion from the lid. The case includes a latch 20 preferably made of the same material as the body portion and the lid and includes a projection 22 on one of the body portion and the lid which engages a catch 30 on the other of the body portion and lid. In one embodiment the projection is located on the lid and the catch is located on the body portion. A pair of slots 42, 44 for receiving the fishing pole P are defined by laterally spaced arcuate portions in the body portion 46, 48 and in the lid 50, 52 which are vertically aligned to define longitudinally aligned fishing pole slots of a size to receive the diameter of most presently used fishing poles. Projections to hold the fishing pole in place are provided on the body portion 62, 64, and the lid 62, 66 which are located adjacent at least one the longitudinally spaced slots 42 in the case. Preferably the projections are made of the same material as the body portion and the lid and extend upwardly from the body portion and downwardly from the lid, and longitudinally inwardly to engage the pole and hold it in place. Preferably projections are provided on both sides of the case. Preferably the projections are tapered with the cross section of the projections decreasing from a maximum at the juncture of the body portion or lid and the projection to a minimum at the inner end of each projection. A second pair of fishing line slots 80 laterally spaced from the fishing pole slots are defined by formed openings 82, 86 in the body portion and 84, 88 in the lid which are vertically aligned. These fishing line slots receive the fishing line L, and allow a lure 87 having a hook H to be located within the case with the hook engaging a guide 90 on the pole.

IV BRIEF DESCRIPTION OF THE DRAWINGS

FIG. 7 is a sectional view looking in the direction of the arrows along the line 7—7 in FIG. 3.

FIG. 8 is a sectional view looking in the direction of the arrows along the line 8—8 in FIG. 3.

FIG. 9 is a sectional view looking in the direction of the arrows along the line 9—9 in FIG. 6.

FIG. 10 is a sectional view looking in the direction of the arrows along the line 10—10 in FIG. 9.

FIG. 11 is a sectional view looking in the direction of the arrows along the line 11—11 in FIG. 9.

V DESCRIPTION OF PREFERRED EMBODIMENTS

Figure 1:
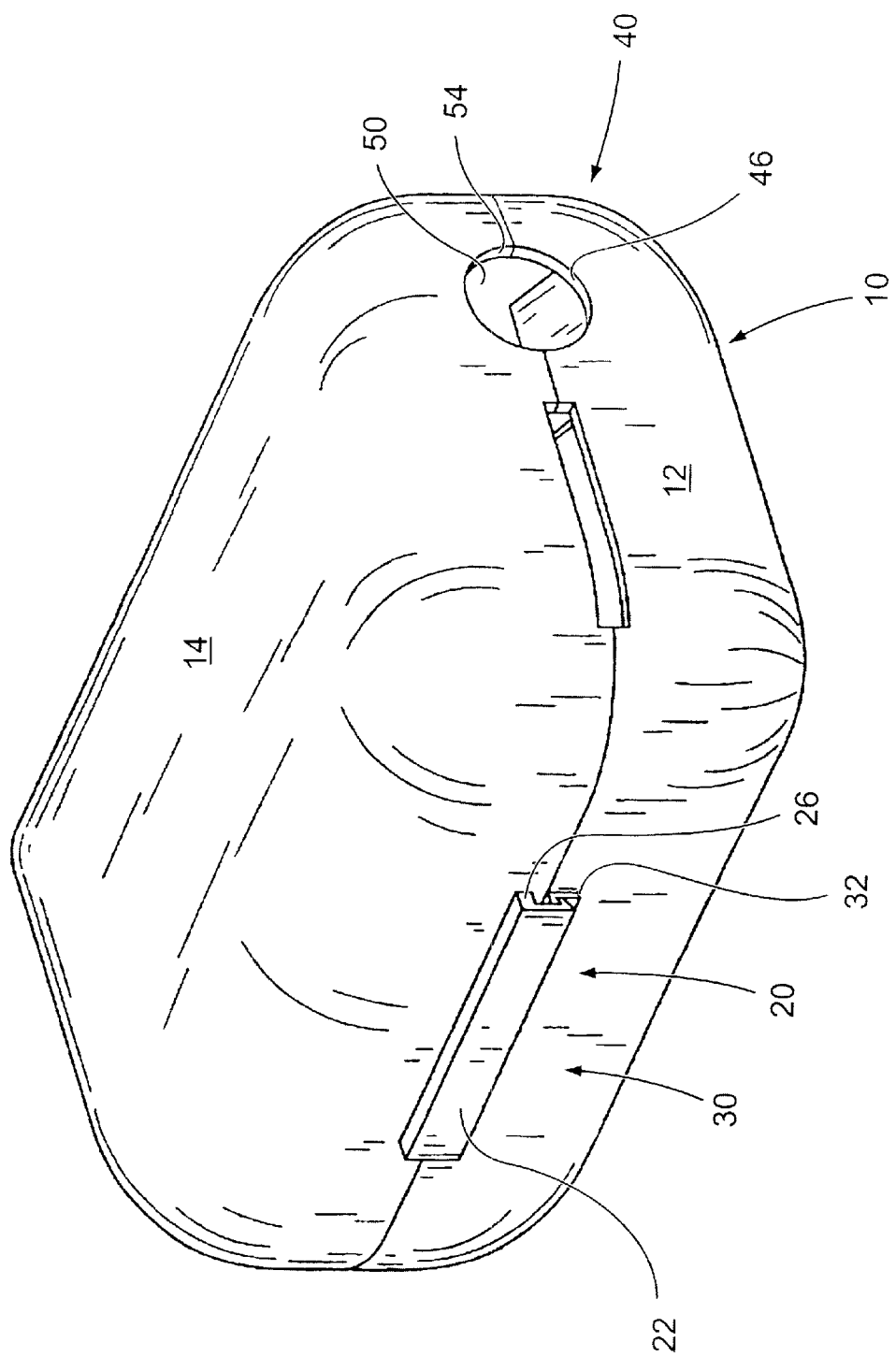
FIG. 1 is a perspective view of the improved lure and fishing pole case of the present invention, with the case in closed position.

The improved lure and fishing pole case of the present invention is indicated in the drawings at (10). The case includes a body portion (12) and a top or cover (14).

Preferably the case is made of plastic material having sufficient strength to maintain a pole and lure in place within the case and having sufficient flexibility to allow varying sizes of poles and lures to be utilized therewith. Examples of such plastic material include olefin polymers and co-polymers such as ethylene-propylene co-polymers for example Aristech TI-4070-G, whose properties are included in the Appendix.

The case includes a hinge portion (16) containing a slot (18) of sufficient length to enable the top member to move from the closed position illustrated by solid lines in FIG. 8 to the open position illustrated by phantom lines. The plastic material should have sufficient resilience to enable pivoting action to occur between the open and closed positions of the top.

In one embodiment, the thickness of the top (14) and the body portion (12) is 0.1 inches. The length of slot (18) is about 0.25 to 0.35 inches, preferably about 0.29–0.33 inches. The increased thickness of the hinge portion (16) is from about 0.25 inches to about 0.33 inches.

A latch assembly (20) includes a latch member (22) located on the top or cover (14) which includes a body portion (24) and a back portion (26) integrally formed with the top (14) and includes a projection (28). A catch assembly (30) located on the body portion (12) includes a leg (32) which is integral with the body portion (12) and is of increased thickness and includes a protrusion (34) which is a adapted to be engaged by the projection (28) on the lid (14) when the case is in the closed position. The projection (28) should have sufficient resilience to move into a closed and locked position over the protrusion (34). FIG. 7 shows the latch assembly (20) and the catch assembly (30) in the closed position.

Means for receiving a fishing pole indicated generally at (40) include slot members (42) and (44) located at opposite ends of the case and that are mirror images of each other. The body portion (12) includes arcuate pole receiving surfaces (46) and (48) at opposite ends of the body portion. The lid includes arcuate portions (50) and (52) located at opposite ends of the case. These arcuate portions are designed to have a diameter to receive a wide variety of fishing poles to include those commonly used, which is from about 0.5 to 1.0 inches. FIG. 1, for example, shows the arcuate portions (50) and (46) defining an opening (54) to receive a pole. The other arcuate portions. (48) and (52) define another opening (56) to receive an opposite portion of the pole, P.

Means for engaging and guiding the pole within the case are indicated generally at (60). This guiding and engagement means comprises projections (62) and (64) on the body portion of the case and projections (66) and (68) on the lid portion. These projections are preferably made of the same plastic material as is the body portion and the top or lid. Each of these projections includes a base portion (70) which is formed integrally with the body portion or lid and a tapered projecting portion (72) extending inwardly towards the pole location and terminating in an outer edge (76). The projections (62), (64), (66) and (68) are formed to have a length such that a variety of pole sizes and diameters can be engaged by the projections when such poles are located within the case, for example about 0.3 to 0.7 inches, preferably about 0.4 to 0.6 inches.

FIG. 9 shows the projections (62), (64), (66) and (68) engaging a pole as the pole is located within the case. FIG. 11 shows that the end portions of the projections (66E) and 62E) will engage the pole, as will end portions (64E) and (68E).

Figure 6:
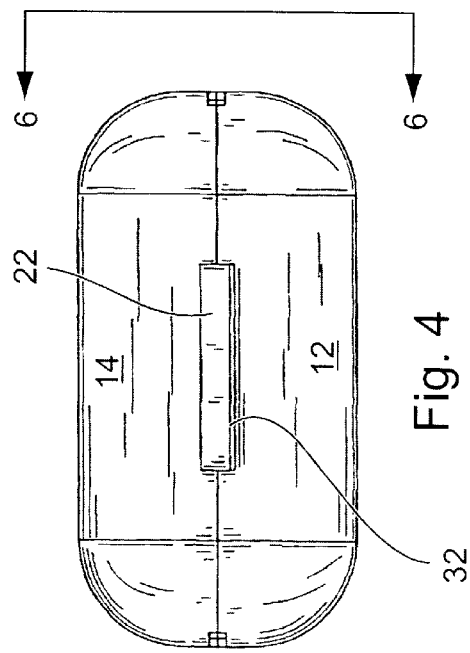
FIG. 6 is a side elevation view of the case of the present invention looking in the direction of the arrows along the line 6—6 in FIG. 4.

Means for receiving the fishing line are indicated generally at (80) and comprise a pair of slots (82) and (84) in the body portion (12) and the lid (84) located at one end of the case, and another pair of slots (86) and (88) located at the opposite end of the case in the body portion (12) and the lid (14). FIG. 6 shows the case in the closed position with the slots (82) and (84) defining an enlarged opening for receiving the line L. The size of these slots are such as to provide flexibility for the line and also for lures which may be utilized and which are conveniently connected to the eyelet (90) shown in FIG. 9 and in FIG. 2. The hook "H" on the lure is commonly connected to the eyelet to avoid danger of the hook being free and a danger to personnel.

Figure 12:
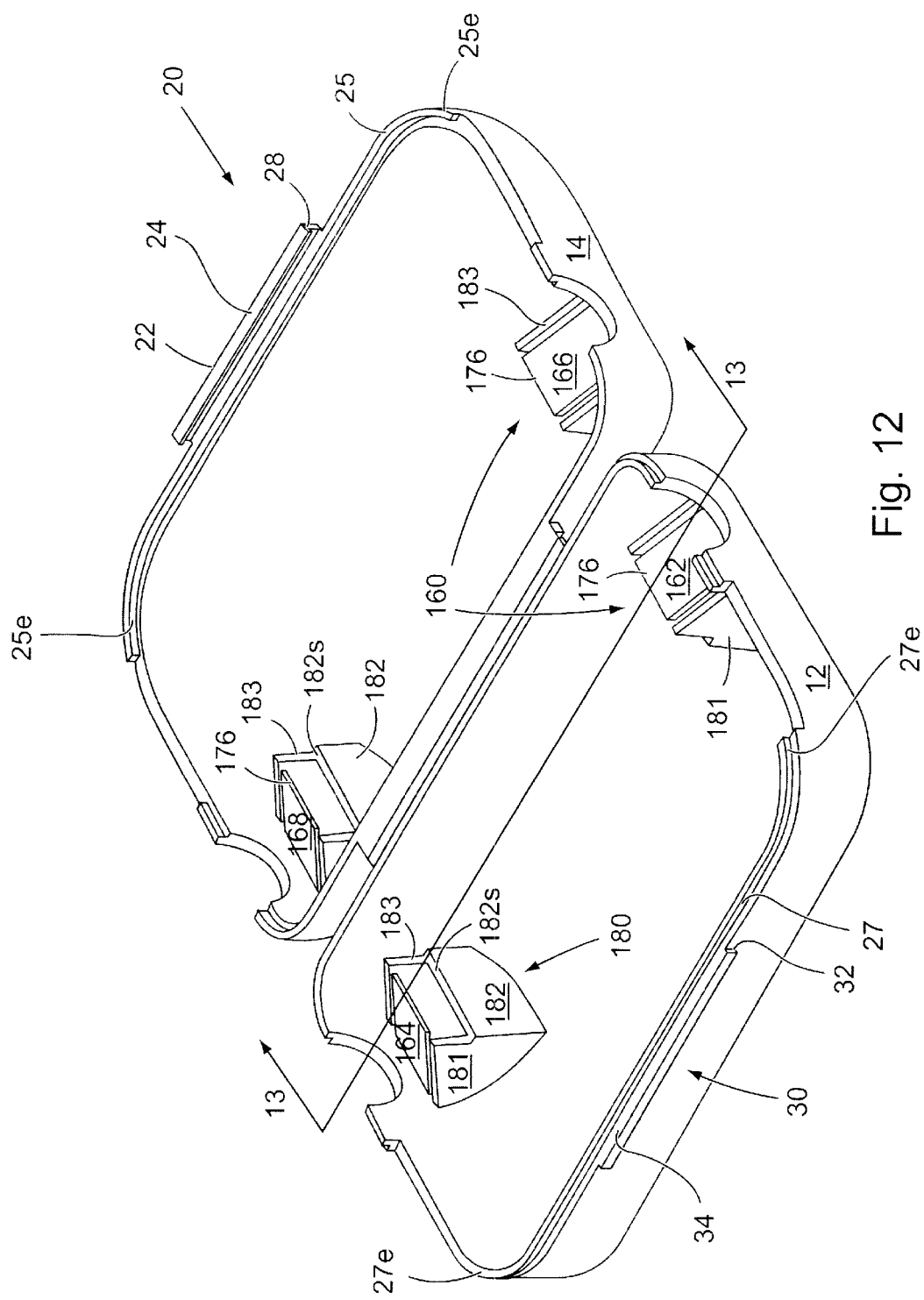
FIG. 12 is a perspective view of another embodiment of the present invention with the case in open position.
Figure 13:
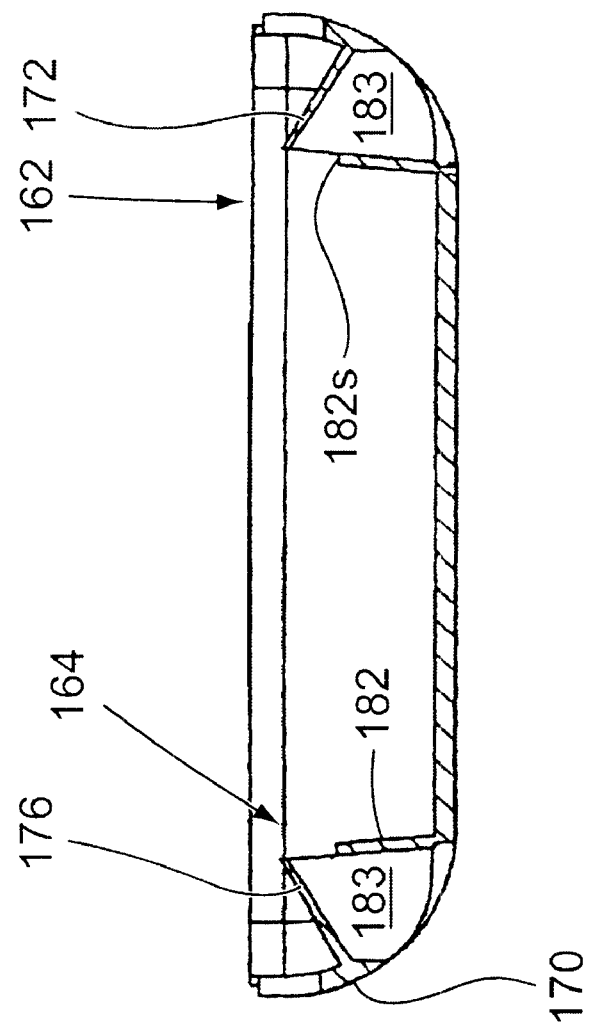
FIG. 13 is a sectional view looking in the direction of the arrows along the line 13—13 in FIG. 12.

Another embodiment of the invention is shown in FIGS. 12–13. In this embodiment a rib (25) is provided on the top (14), which is curved at its ends (25e) to follow the contour of the top (14). A corresponding rib support (27) is provided on bottom (12), which is also curved at its end portions (27e). This arrangement provides a stronger, more rugged arrangement when the case is in the closed position.

Alternative means for engaging and guiding the pole within the case are indicated generally at (160). This guiding and engagement means comprises projections (162) and (164) on the body portion of the case and projections (166) and (168) on the lid portion. These projections are preferably made of the same plastic material as is the body portion and the top or lid. Each of these projections includes a base portion (170) which is formed integrally with the body portion or lid and a tapered projecting portion (172) extending inwardly towards the pole location and terminating at an outer edge (176). Projection support means (180) include side walls (181) and (183), and front walls (182), which are shorter than side walls (181) and (183). In normal unengaged positions, the projection ends (176) are spaced above the upper surfaces (182s) of the front walls (182). But when poles are placed within the case, the projection ends (176) approach or contact the upper surface (182s), depending on the diameter of the pole at those points. The projections (162), (164), (166) and (168) are formed of a length such that a variety of pole sizes and diameters will be engaged by the projections when such poles are located within the case, for example about 0.3 to 0.7 inches, preferably about 0.4 to about 0.6 inches.

This embodiment provides better support for the poles when they are inside the case and is somewhat easier to mold. Otherwise, this embodiment is basically the same as the embodiment shown in FIGS. 1–11.

The use of a single piece of plastic material folded into the shapes illustrated in the Drawings represents an improvement in the cost and ease of manufacture of the present invention. The avoidance of the need for separate hinge members and for separate latch members to hold the pole in place, represents an improvement over U.S. Pat. No. 2,767, 502.

Furthermore, the use of the projections (62), (64), (66) and (68) allows a variety of sizes of poles to be held in place, in contrast to the single size latch in the '502 Patent.

Thus the present invention is simpler to manufacture and is less expensive.

Figure 2:
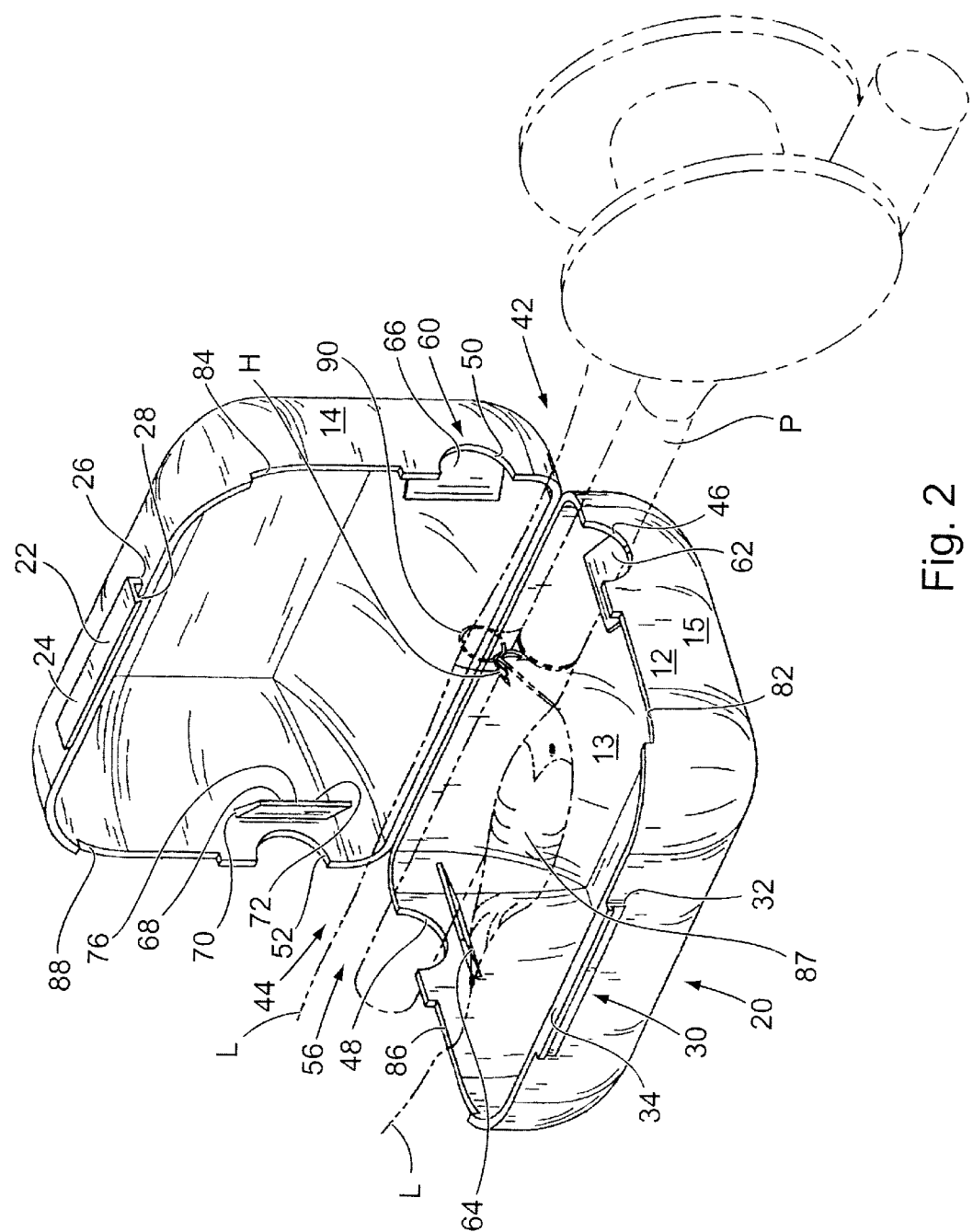
FIG. 2 is a perspective view of the improved case of the present invention with the case in open position and the pole and lure located within the case.
Figure 3:
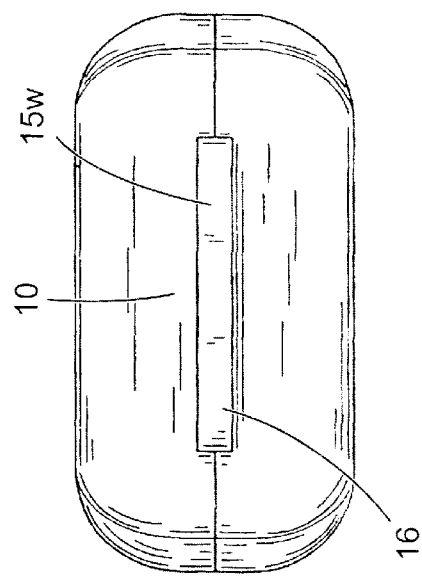
FIG. 3 is a plane view of the improved case of the present invention.
Figure 4:
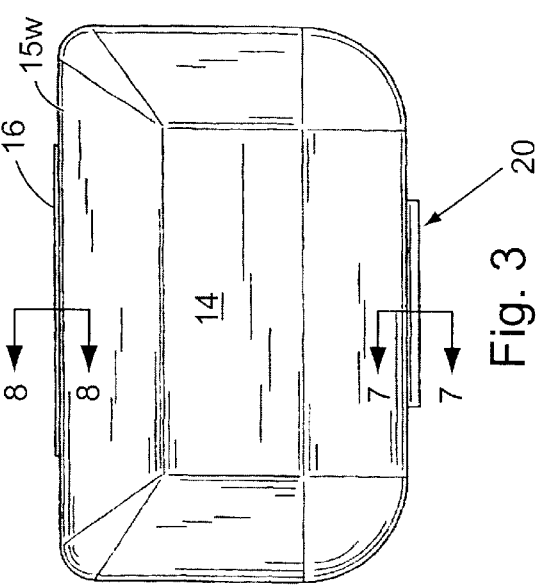
FIG. 4 is a front elevation view of the improved case of the present invention.
Figure 5:
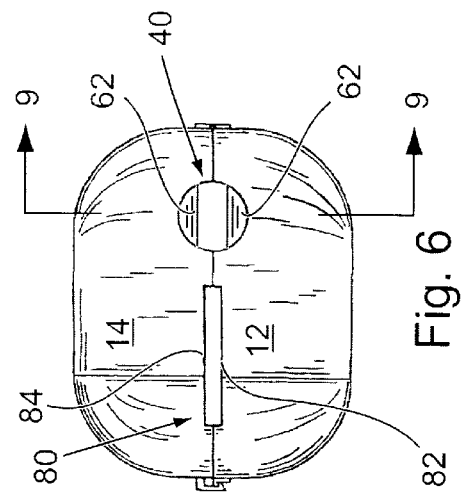
FIG. 5 is a rear elevation view of the improved case of the present invention.

To utilize the case of the present invention, the latch assembly (20) is activated by the operator and the lid is pivoted from the closed position shown in FIG. 4 to the open position shown in FIG. 2. A fishing pole "P" having a line "L" is then located within the arcuate portions (46) (50)—(48) (52) to hold the pole in place. The projections (62), (66), (64), (68) shown in FIG. 2 or the projections (162), (164), (166), (168) shown in FIG. 12 hold the pole P in place, and the hook H is attached to the eyelet 90 for safety. The lid is then moved back to the closed position shown in FIG. 1 with the latch assembly 20 engaging the catch assembly 30 as shown in FIGS. 1 and 7.

What is claimed is:

1. An improved case for fishing poles and lures comprising:

a concave body portion made of strong and resilient plastic material having a bottom and at least one side wall;

a lid made of the same plastic material as the body portion;

hinge means for pivotally connecting the lid to the at least one side wall; said hinge means being integral with said body portion and said lid;

a latch means for selectively preventing the lid from pivoting relative to the at least one side wall, the latch means comprising a clasp located on one of the body portion and the lid which engages a catch on the other of the body portion and lid;

a pair of fishing pole slots, each of the fishing pole slots being defined by first and second vertically aligned lateral openings, the first lateral opening of each of the fishing pole slots being formed in the lid and the second lateral opening of each of the fishing pole slots being formed in the body portion, the pair fishing pole slots being longitudinally aligned and dimensioned to receive the diameter of a fishing pole;

first and second pairs of pole projections configured and adapted to engage a fishing pole to hold thing pole in place, one of each of the pairs of pole projections extending upwardly the body portion and the other of each of the pairs of pole projections extending downwardly from the lid, the first pair of pole projections being positioned adjacent one of the pair of fishing pole slots and the second pair of pole projections being positioned adjacent the other of the pair of fishing pole slots, each of the pole protrusions extending longitudinally inwardly and each of the pole projections tapering in a manner such that a cross section of the projection increases from a minimum at an inner end of each projection to a maximum at a portion of the projection where the projection is attached to one of the body portion and the lid;

projection supports positioned to support said projections when a fishing pole is placed within the case, each of the projection supports comprising at least one generally vertical front wall located adjacent the inner end of one of the projections and a pair of laterally spaced side walls on opposite sides of the one projection which engage and support the front wall; and a pair of fishing line slots laterally spaced from said fishing pole slots, each of the fishing line slots being defined by first and second vertically aligned openings, the first opening of each of the fishing line slots being formed in the lid and the second opening of each of the fishing line slots being formed in the body portion, the fishing line slots being configured and adapted to receive a fishing line to thereby allow a fishing lure having a hook to be located within the case with the hook engaging a guide of a fishing pole.

\* \* \* \* \*